United States Patent [19]

Aubert

[11] 4,302,937
[45] Dec. 1, 1981

[54] PRESSURE LIMITER-REGULATOR

[75] Inventor: Paul Aubert, Clamart, France

[73] Assignee: Regie Nationale des Usines Renault, Boulogne-Billancourt, France

[21] Appl. No.: 79,737

[22] Filed: Sep. 28, 1979

[30] Foreign Application Priority Data

Sep. 29, 1978 [FR] France ................................ 78 27976

[51] Int. Cl.³ .................... F16D 33/00; G05D 11/02; G05D 16/00
[52] U.S. Cl. ..................................... 60/330; 137/116; 137/505.11
[58] Field of Search .................. 60/339, 330; 137/115, 137/505.18, 505.11, 116, 512.5; 91/468; 138/46

[56] References Cited

U.S. PATENT DOCUMENTS

| 2,984,251 | 5/1961 | Quinby | 137/505.18 X |
| 3,324,873 | 6/1967 | Trombatore et al. | 137/116.3 |
| 3,367,354 | 2/1968 | Gallant | 137/115 X |
| 3,517,681 | 6/1970 | Davison | 137/505.18 |
| 4,046,160 | 9/1977 | Horsch | 137/115 |

FOREIGN PATENT DOCUMENTS

| 2077094 | 10/1971 | France . |  |
| 2253158 | 6/1975 | France . |  |
| 1437703 | 6/1976 | United Kingdom | 137/115 |
| 510590 | 6/1976 | U.S.S.R. | 91/468 |

Primary Examiner—Irwin C. Cohen
Attorney, Agent, or Firm—Owen, Wickersham & Erickson

[57] ABSTRACT

A pressure limiter-regulator for a hydraulic control circuit. In a single body, a single spring acts both on a central spindle, which provides the pressure regulating function, and on a ball which provides the limiting function. The invention is applicable to the hydraulic feeding of a hydrokinetic torque converter.

7 Claims, 2 Drawing Figures

4,302,937

PRESSURE LIMITER-REGULATOR

BACKGROUND OF THE INVENTION

This invention relates to a pressure limiter-regulator using a single resilient means as a reaction member for both the pressure regulating action and the pressure limiting action.

A number of devices are known which make it possible to control and limit the pressure value of a hydraulic circuit to a preset value.

Other devices are also known which make it possible to control the pressure of a hydraulic circuit and to regulate that pressure to a desired value.

These two distinct devices are separated in the hydraulic circuit in which they are used and they are connected to each other by ducts.

Each of these devices comprises its own resilient means as a reaction member. In the devices which limit the pressure to a predetermined value, a ball is generally pushed by a resilient means against a seat, in the center of which there is a duct. When the pressure in the duct exceeds the predetermined value above which the hydraulic circuit might be damaged, the ball pushes the resilient means back and lets the oil pass into a chamber, which oil then leaves through another duct going out of the chamber and generally connected to the hydraulic circuit tank. In the pressure regulating devices, a central spindle can generally be moved to one side under the action of the hydraulic circuit pressure and to the opposite side under the action of a resilient means. Thus, the spindle is continuously balanced under these two opposed actions. This central spindle has several shoulders which, when moved sideways, act as a spool by closing or opening ports. The spool thus more or less throttles the inlet of the pressure oil and allows it to pass into the outlet duct.

These two types of devices also make use of two bodies, each with its own resilient means. If the hydraulic circuit is an integral part of a hydraulic block, each device requires its own bore and its own housing for its own resilient means.

It is an object of this invention to provide a single pressure limiter-regulator of a specially simple farbrication.

SUMMARY OF THE INVENTION

The pressure limiter-regulator according to the invention comprises a single body in which a spindle slides and acts as a spool. This spindle has two shoulders which, when moved sideways, act as a spool by more or less closing or opening a port through which the feed fluid enters and a port through which the fluid leaves. Moreover, the outlet fluid acts upon one of the spool ends. A resilient means on the other spool end acts to balance the opposed action of the outlet fluid pressure. At its other end the resilient means acts upon a sealing member of a second inlet duct of the feed circuit. The chamber in which the single resilient means and the sealing member are housed is connected to the atmosphere or to a return-to-tank duct.

In a preferred embodiment, the single resilient means can be a single spring.

In another preferred embodiment, the obturating member can be a ball.

The pressure limiter-regulator according to the invention can advantageously be applied to the feeding at a predetermined pressure of a hydrokinetic torque converter and of a lubricating system for an automatic vehicle gear box.

The pressure limiter-regulator according to the invention has the advantage of two hydraulic functions being combined in a single device using one single balancing resilient means. It requires only one single feed duct and only one single return-to-tank duct. As an integral part of a hydraulic block, the pressure limiter-regulator according to the invention requires only one single bore instead of two and, on fabrication of the block, this device requires only one single machining head instead of two. Moreover, there are only one single resilient means and only one single housing for the resilient means. On the other hand, the pressure limiter-regulator according to the invention ensures the protection of a hydrokinetic torque converter when it is connected to the feeding of the latter.

Other features and advantages of this invention will become apparent from the following description of a particular embodiment given as an example and not restricted thereto, with reference to the enclosed drawings in which:

DESCRIPTION OF SOME PREFERRED EMBODIMENTS

Figure 1:
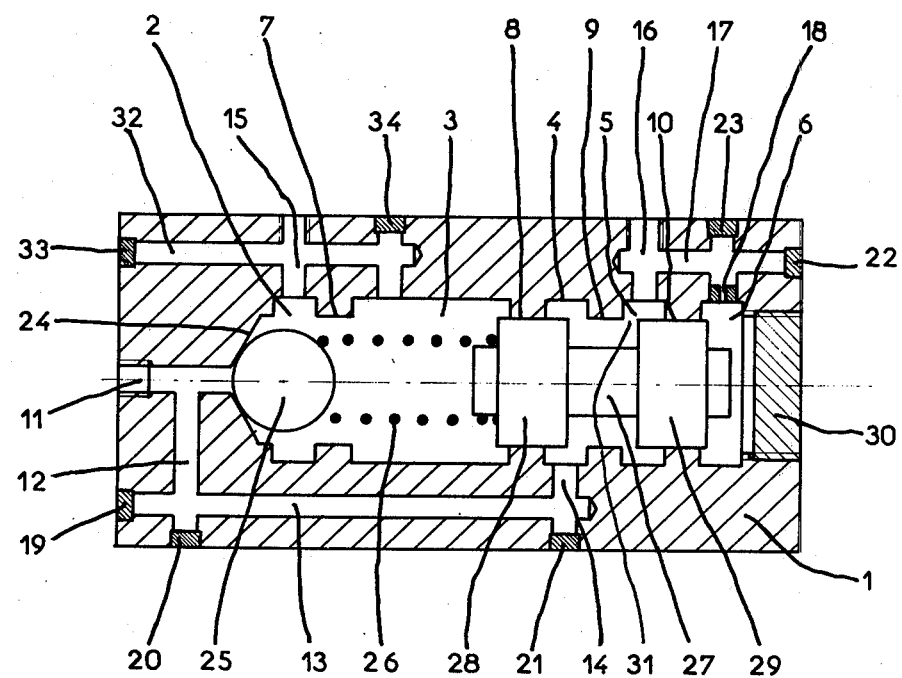
FIG. 1 is a longitudinal cross-section of the limiter-regulator according to the invention.

As shown in the longitudinal cross-section of FIG. 1 the pressure limiter-regulator comprises a body 1 which has a central bore. Five chambers 2, 3, 4, 5, and 6 open into the bore, which thus has four bearing surfaces 7, 8, 9, and 10. A central duct 11 opens into the central bore. The chamber 3 is connected through a duct 32 to an outlet duct 15 that leads out from the chamber 2. The duct 11 is connected through the ducts 12, 13, and 14 to the chamber 4. A duct 16 runs out of the chamber 5. The chamber 5 is connected through a duct 17 and a cushioning nozzle 18 to the chamber 6. These different ducts are made by drilling, and then they are closed by the plugs 19, 20, 21, 22, 23, 33, and 34.

The ducts 11, 15, and 16 are threaded for fastening fluid inlet and outlet pipes. A frustoconical bearing surface 24 connects the central duct 11 to the chamber 2. In the central bore are mounted in succession a ball 25, a spring 26 and a spindle 27. The ball 25 is urged against the frustoconical bearing surface 24 by the action of the spring 26 which is compressed between the ball 25 and the spindle 27. Thus the function of the ball 25 is to seal the connection between the duct 11 and the chamber 2. The spindle 27 has two shoulders 28 and 29 which slide in the bearing surfaces 8 and 10. The shoulders 28 and 29 more or less close or open the ports of the chambers 4 and 5 when the spindle 27 moves. A plug 30 closes the central bore. The limiter-regulator according to the invention performs the regulating action as follows: at rest, when the pressure is zero in the feed circuit, i.e. in the duct 11 and the ducts 12, 13, and 14, the single spring 26, on the one hand, urges the ball 25 against its frustoconical seat 24 and, on the other hand, pushes the spindle 27 back against the plug 30.

When the hydraulic feed circuit is in operation, i.e. when a pressure is established in the circuit and fluid flows through the ducts 11, 12, 13, and 14, the chambers 4 and 5, and the outlet duct 16, the central spindle 27 is subject to the action of two opposed forces: on the one hand, the force due to the spring 26 and, on the other hand, the force due to the action of the pressure in the chamber 6 on the end of the spindle 27, i.e. on the total and surface area of the shoulder 29.

When the force due to the pressure in the chamber 6 becomes higher than the force of the spring 26, the central spindle 27 moves and throttles the oil passage 31. Thereby the pressure downstream of the passage 31 decreases; consequently the action due to this pressure in the chamber 6 on the spindle 27 decreases and, under the action of the spring 26, the passage 31 increases. The pressure in the outlet duct 16, the duct 17 and the chamber 6 therefore depends upon the spring 26 and the end surface area of the shoulder 29 of the spindle 27. The regulated pressure at the outlet of the device is given by the equation: spring force = outlet regulated pressure × surface area of the shoulder 29 of the spindle 27.

The limiter-regulator according to the invention performs the limiting action as follows: at rest, when the pressure is zero in the feed circuit, i.e. in the duct 11, the ball 25 is urged against its seat 24 by the spring 26. When the pressure is established in the duct 11 and remains below a predetermined value, the ball 25 remains pressed on its seat and goes on sealing the duct 11. When the pressure in the duct 11 exceeds the predetermined value, the ball 25 is moved away from its seat 24 and a pressure drop is created in the duct 11 by connecting the duct 11 with the chamber 2 and the duct 15 which is connected with the tank or with the atmosphere. This value of predetermined pressure is given by the equation: force of spring 26 = pressure in the duct 11 × surface area of the contact circle of the ball 25 on its seat 24.

Figure 2:
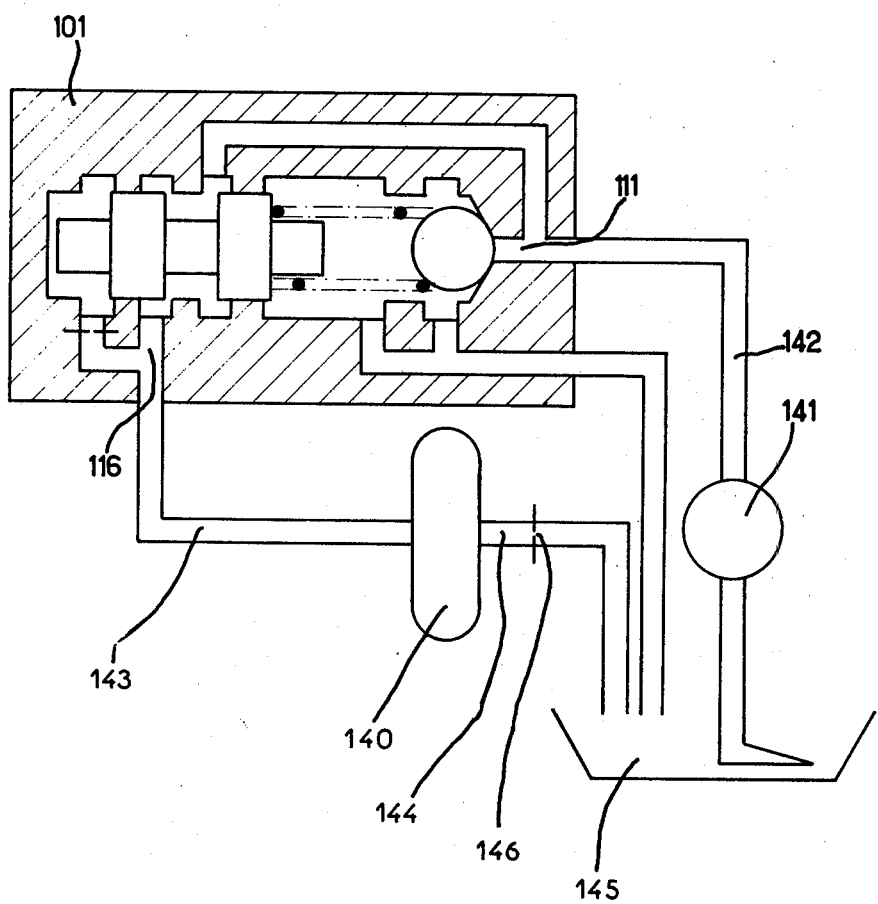
FIG. 2 shows the limiter-regulator of FIG. 1, feeding a hydrokinetic torque converter.

An application of the pressure limiter-regulator according to the invention is given in FIG. 2. The above-described limiter-regulator 101 is connected with the feed duct of a hydrokinetic torque converter 140. A pump 141 supplies the fluid through a duct 142 which opens into a feed duct 111 of the limiter-regulator 101. A duct 143 connects an outlet duct 116 of the limiter-regulator 101 with the converter 140. The converter 140 has its fluid outlet connected with a duct 144 which returns to a tank 145. A nozzle 146 mounted on the return duct 144 ensures the desired flow rate at the outlet of the converter 140.

The limiter-regulator 101 thus protects the converter which is fed at a pressure regulated at a predetermined value and at a flow rate regulated in the same way. In addition, the limiter-regulator 101 protects the whole hydraulic circuit from any accidental surge pressure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pressure limiter-regulator for a hydraulic control circuit having a fluid reservoir performing the functions of relieving excess inlet pressure and of regulating the outlet pressure, comprising:
   a body having a fluid inlet duct, a fluid outlet duct, and a return-to-reservoir duct,
   pressure regulating means in said body for regulating the outlet pressure of the fluid and including a sliding member having a first end subjected to the pressure of the fluid in the outlet duct, and having a second end, said sliding member having means for throttling the fluid passage between said inlet duct and said outlet duct, thereby regulating the outlet pressure,
   pressure limiting means in said body for limiting to a predetermined maximum the pressure entering the body from the inlet duct, having a movable member for normally closing off said inlet duct from said return-to-reservoir duct and for connecting said return-to-reservoir duct to said inlet duct when a predetermined maximum pressure is reached, thereby relieving excess inlet pressure, and
   a single resilient means between and acting on both said second end of said sliding member and said movable member.

2. A pressure limiter-regulator according to claim 1 wherein said single resilient means is a spring.

3. A pressure limiter-regulator according to claim 1 wherein said movable member is a ball.

4. A pressure limiter-regulator for a hydraulic control circuit having a fluid reservoir, comprising:
   a body having a fluid inlet duct, a fluid outlet duct, a return-to-reservoir duct, and first, second and third chambers serially arranged along a central passageway, said inlet duct being connected in parallel to said first and second chambers, said outlet duct being connected in parallel to said second and third chambers, and said return-to-reservoir duct being connected only to said first chamber,
   pressure regulating means in said body and largely in said second chamber for regulating the outlet pressure of the fluid and including a sliding member in said central passageway having a first end subjected to the pressure of the fluid in said third chamber, which is the pressure of the fluid in the outlet duct, and having a second end, said sliding member having means for throttling the fluid passage into said second chamber from said inlet duct and from said second chamber into said outlet duct,
   pressure limiting means in said first chamber for limiting the pressure to a predetermined maximum, having a seat at one end of said central passageway where said inlet duct enters said first chamber and a sealing member in said central passageway for moving against said seat and normally closing said first chamber off from said inlet duct, until a predetermined maximum fluid pressure in said inlet duct moves said sealing member off said seat and connects said inlet duct, through said first chamber, to said return-to-reservoir duct, and
   a single resilient means between and acting both on said second end of said sliding member and on said sealing member.

5. A pressure limiter-regulator according to claim 4 wherein a cushioning flow-restricting nozzle connects said outlet duct to said third chamber.

6. A pressure limiter-regulator for a hydraulic control circuit having a fluid reservoir, comprising:
   a body having a fluid inlet duct, a fluid outlet duct, a return-to-reservoir duct, and first, second and third chambers serially arranged along a central passageway, said inlet duct being connected in parallel to said first and second chambers, said outlet duct being connected in parallel to said second chamber and, via a cushioning orifice, to the third chamber, and said return-to-reservoir duct being connected only to said first chamber, pressure regulating means for regulating the outlet pressure of the fluid and including a sliding spool member in said second chamber having a narrow portion between first and second shoulder portions that moves in a bore portion of said central passageway and divides said second chamber from each of said first and third chambers, the end of said first shoulder facing said third chamber and being subjected to the pressure of the fluid in said third chamber, which is substantially the pressure of the fluid in the outlet duct, the end of said second shoulder facing said first chamber, said first and second shoulders throttling the fluid passage into said second chamber from said inlet duct and from said second chamber into said outlet duct, pressure limiting means in said first chamber for limiting the inlet pressure applied to said pressure regulating means to a predetermined maximum, having a seat where said inlet duct enters said first chamber and a sealing ball in said central passageway for moving against and away from said seat and closing off said first chamber from and opening it to said inlet duct, and a single spring between and acting on both said end of said second shoulder of said sliding member and said sealing ball.

7. A hydraulic control circuit, comprising:

a fluid reservoir, a fluid pump pumping fluid from said reservoir, a body having a fluid inlet duct connected to said fluid pump, a fluid outlet duct, a return-to-reservoir duct connected to said reservoir, and first, second and third chambers serially arranged along a central passageway, said inlet duct being connected in parallel to said first and second chambers, said outlet duct being connected in parallel to said second and third chambers, and said return-to-reservoir duct being connected only to said first chamber, a torque converter connected to said outlet duct and connected through a restricting orifice to said reservoir, pressure regulating means in said body for regulating the outlet pressure of the fluid, so that said torque converter is provided with fluid at a constant pressure, and including a sliding member in said central passageway having a first end subjected to the pressure of the fluid in said third chamber, which is the pressure of the fluid in the outlet duct, and having a second end, said sliding member throttling the fluid passage into said second chamber from said inlet duct and from said second chamber into said outlet duct, pressure limiting means in said first chamber for limiting the inlet pressure applied to said pressure regulating means to a predetermined maximum having a seat at one end of said central passageway where said inlet duct enters said first chamber and a sealing member in said central passageway for moving against said seat and normally closing said first chamber off from said inlet duct, until a predetermined maximum fluid pressure in said inlet duct moves said sealing member off said seat and connects said inlet duct, through said first chamber, to said return-to-reservoir duct, and a single resilient means between and acting on both said second end of said sliding member and said sealing member.

* * * * *